Jan. 25, 1955  W. L. THOMPSON  2,700,270
SELF-CLEANING HAND RAKE
Filed April 14, 1953
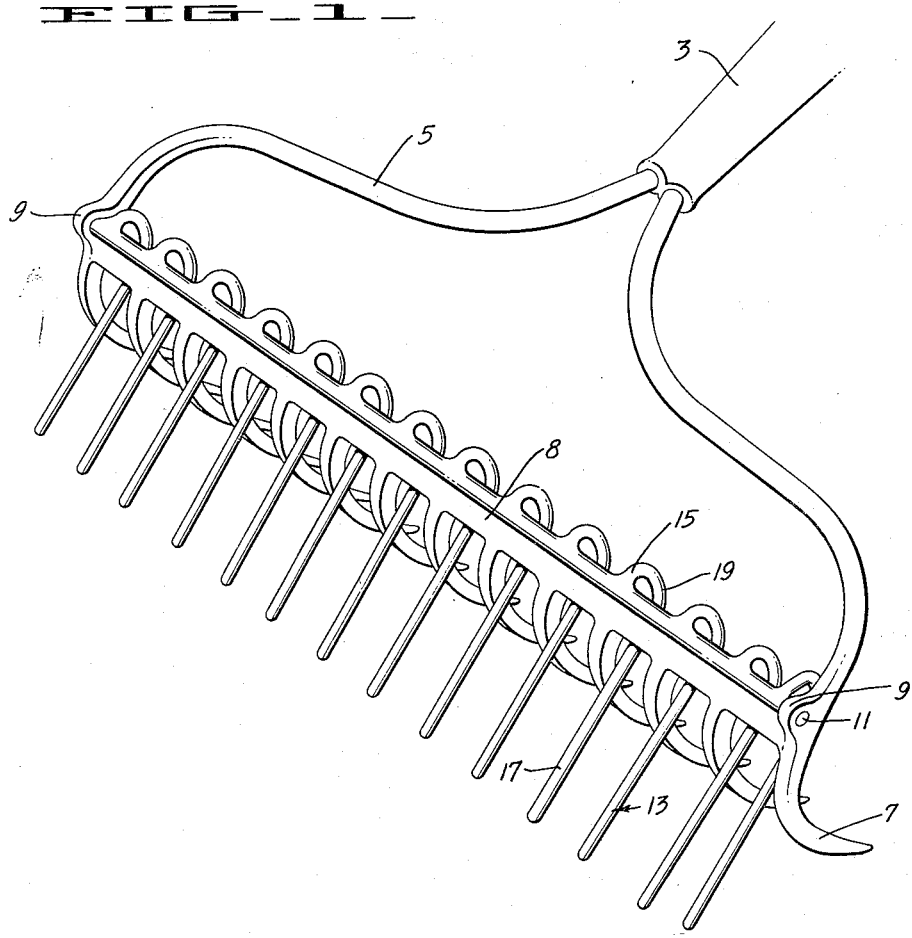
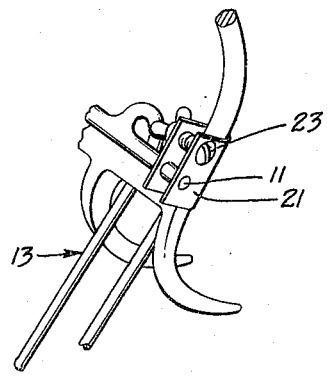
INVENTOR.
William L. Thompson
ECKHOFF & SLICK, Attys.
BY
*A member of the firm*

United States Patent Office 2,700,270
Patented Jan. 25, 1955

2,700,270

SELF-CLEANING HAND RAKE

William L. Thompson, Orland, Calif.

Application April 14, 1953, Serial No. 348,738

1 Claim. (Cl. 56—400.08)

This invention relates to a rake and particularly to a self-cleaning rake. The rake of the present invention can be manufactured as a complete self-cleaning rake or, in accordance with another embodiment of the invention, a self-cleaning attachment may be manufactured which can be easily clamped onto a conventional rake.

In raking leaves and the like, it is often observed that the rake will become clogged with leaves so that it becomes much less efficient. It is then necessary to stop and remove the impacted leaves, or other matter, by hand, greatly slowing down the raking operation.

It is an object of the present invention to provide a rake which has a fully automatic cleaning feature.

Another object of this invention is to provide a self-cleaning attachment which can be readily adapted for use on existing rakes.

Still another object of this invention is to provide a rake wherein the self-cleaning attachment has curved teeth which are positioned on the rake in such a manner that they will not interfere with the normal operation of the rake.

In the drawings:

Figure 1 is a perspective view of a rake embodying the cleaning teeth of the present invention.

Figure 2 is a perspective view of one end of a rake, showing the manner in which the device of the present invention can be attached to an existing rake.

Referring now to the drawings by reference characters, there is shown a rake having a handle 3 with a fork-like extension 5 for holding the back member 8 to which is attached the teeth 7. In accordance with the present invention, the extension 5 is provided with two bosses 9, which are drilled to receive a shaft 11. The shaft 11 is free to rotate. The shaft 11 is provided with a series of auxiliary teeth fastened thereto which are generally designated 13. Each of the auxiliary teeth 13 is made in a U-shape, so that the portion of the tooth, designated 15, which is attached to the shaft 11, lies substantially parallel to the major portion of the tooth 17, the portions 15 and 17 being joined together by a short section 19, which is substantially at right angles to each of said sections. In this manner, the point of pivoting the teeth, i. e., the shaft 11, lies upon substantially the same vertical line, when the rake is in its normal operative position, as the point of attachment of the teeth 7. It has been found that by employing teeth with a U-shape configuration, there is less interference by the auxiliary teeth with the normal operation of the rake.

In operation, the rake of the present invention is entirely automatic. As one reaches out to rake, the rake is touched to the ground slightly before the arms of the user are fully extended and the rake is pushed backward slightly on the ground. This causes the teeth 13 to engage the ground and to be pushed through the spaces between the teeth 7, effecting the cleaning operation. Then, as the rake is pulled forward, the teeth 13 swing out of the way, thus not interfering in any manner with the normal raking operation.

In Figure 2, I have illustrated a manner of fastening the cleaning device of the present invention to an already manufactured rake. In accordance with this embodiment, a U-shaped clamp 21 is provided which clamps onto the side of the rake, as shown. The clamp 19 is provided with a screw 23, which serves to retain the clamp on the rake. The clamp 21 is also provided with a hole therein to receive the shaft 11. Thus, the device of the present invention can be readily applied to existing rakes.

I claim:

A rake of the hand type having a back member with raking teeth depending therefrom, a shaft pivotally mounted on said rake substantially vertically thereover, and substantially parallel to said back member, said shaft having teeth extending laterally forwardly, downwardly and rearwardly, there being at least one tooth between each pair of raking teeth, whereby said teeth perform efficient self-cleaning between said raking teeth.

References Cited in the file of this patent

UNITED STATES PATENTS

| 915,978 | Loveland | Mar. 23, 1909 |
| 1,132,334 | Granger | Mar. 16, 1915 |

FOREIGN PATENTS

| 10,201 | Switzerland | Mar. 11, 1895 |